Sept. 26, 1967  H. E. WAGNER  3,343,349
GRAPE PRUNER

Filed July 13, 1964  3 Sheets-Sheet 1

HAROLD E. WAGNER
INVENTOR.

BY Tuck & Cole

ATTORNEYS

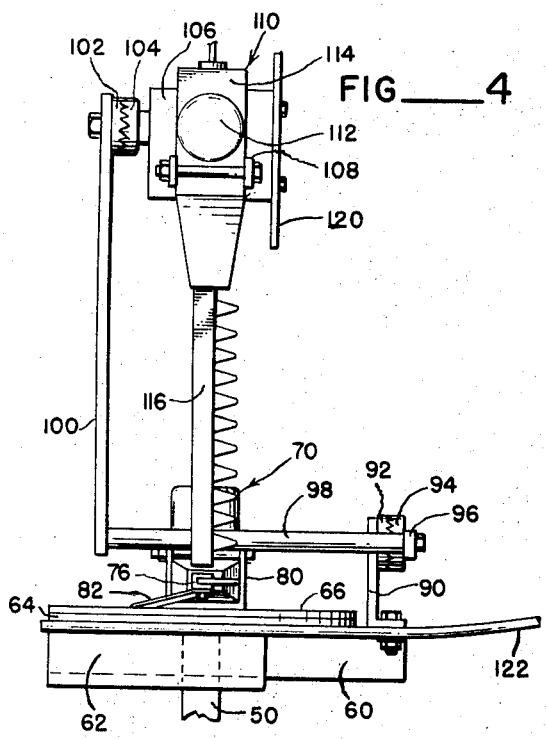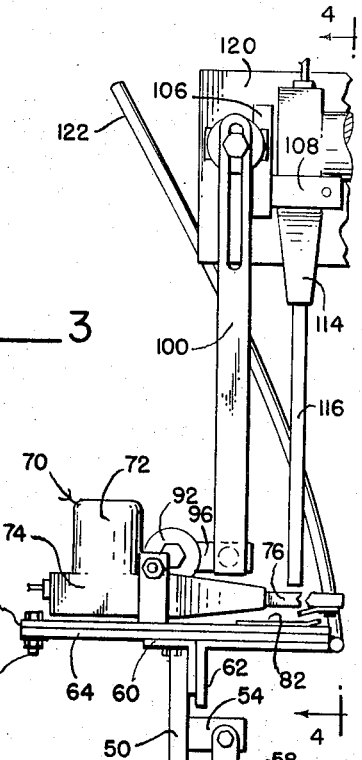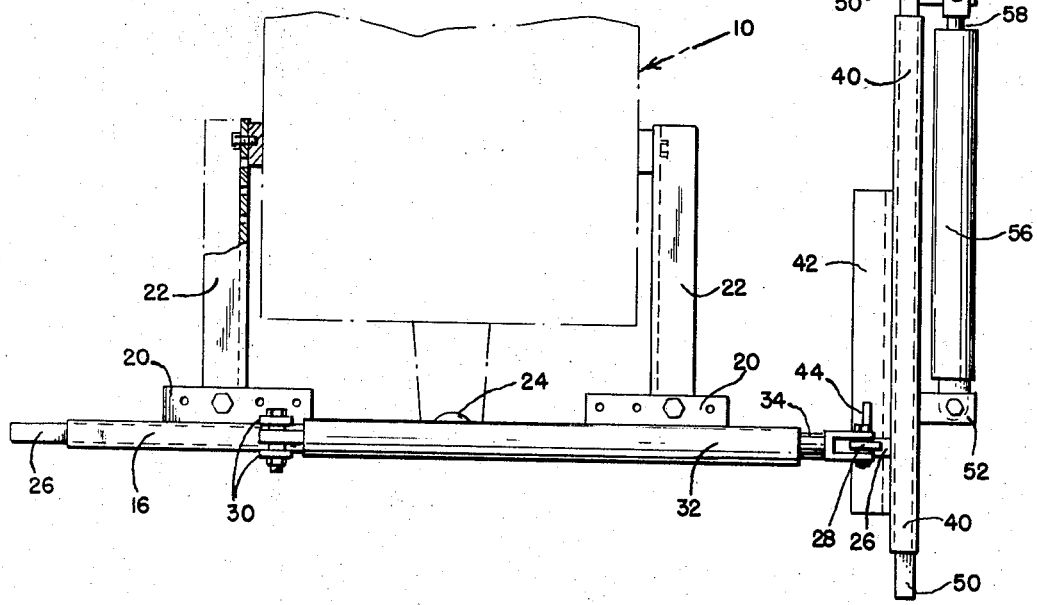

Sept. 26, 1967     H. E. WAGNER     3,343,349
GRAPE PRUNER
Filed July 13, 1964     3 Sheets-Sheet 3
FIG___5
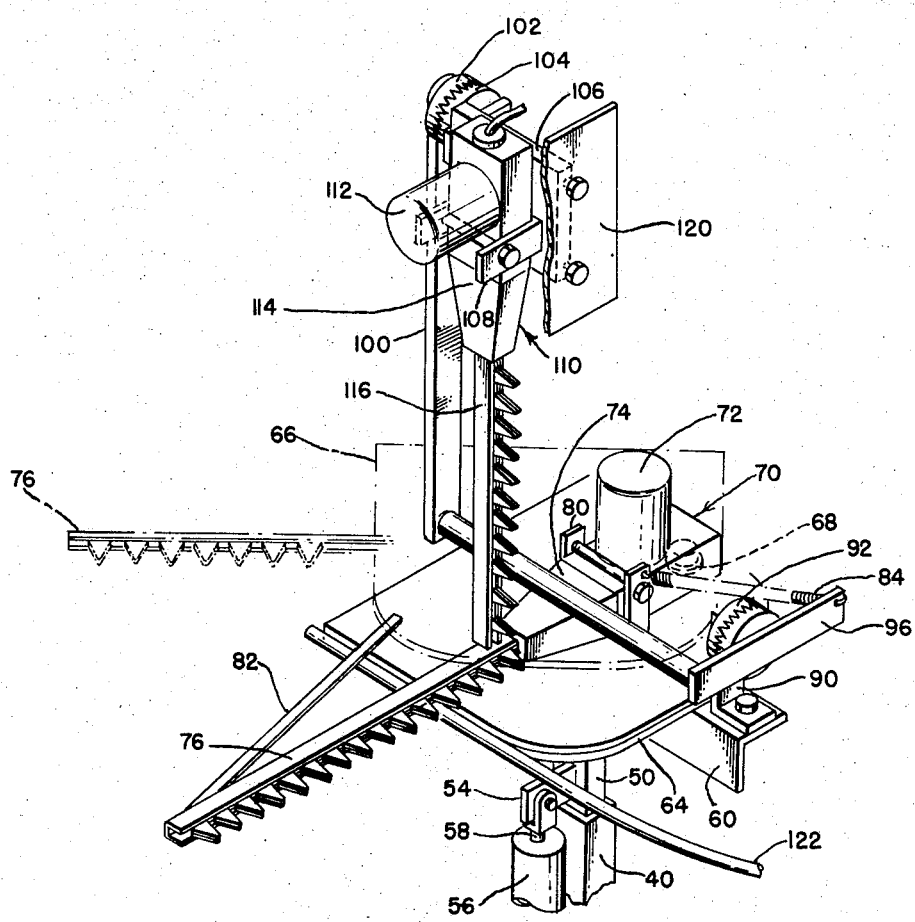
HAROLD E. WAGNER
*INVENTOR.*
BY *Tuck & Cole*
ATTORNEYS

United States Patent Office 3,343,349
Patented Sept. 26, 1967

3,343,349
GRAPE PRUNER
Harold E. Wagner, Rte. 2, Box 196,
Grandview, Wash. 98930
Filed July 13, 1964, Ser. No. 382,166
4 Claims. (Cl. 56—236)

This invention relates to a new, novel, and useful concept in mechanical grape pruners, and more particularly to a tractor-mounted pruning device capable of horizontal and vertical movement and including guiding means so that the vines are more efficiently directed to the cutting elements.

Like other segments of agriculture, the grape industry has recognized that it, too, must mechanize in order to successfully meet the challenge of rising costs. Time-consuming and costly hand-pruning of vineyards has long been a matter of concern to grap growers. A single individual can prune 12 to 18 vines an hour. By way of comparison, the present invention will prune approximately 350 to 400 plants an hour. A man will normally follow the machine to thin out the excess laterals and accomplish a finished pruning job, and in so doing will cover 30 to 40 plants an hour. Thus, it is estimated that pruning with this machine reduces the expense of pruning vineyards by approximately 50 percent.

Conventional vineyards use a two-wire trellis for the grape plants. In order that grower can utilize machine pruning, it is necessary that the conventional two-wire be converted to a single wire trellis. Those skilled in the art will recognize that vines will be cut to include a certain number of buds per spur or lateral. The present invention may be adjusted so that any number, for instance three, four, or five bud spurs may be cut. In general, accomplishment of the pruning features ascribed to this machine is a result of a unique combination of elements mounted on a conventional utility tractor.

Basically, the machine is comprised of an under-slung frame secured to the tractor, which frame includes an extendible and retractable horizontal bar, telescopically or otherwise mounted for movement transversely to the direction of travel of the tractor. At one end of the horizontal bar on one side of the tractor is mounted a vertically disposed bar placed for up and down movement as needed for positioning of the cutting elements or trimmer. The horizontal bar allows the trimmers to be properly spaced with regard to the side of the trellis. The vertical bar, of course, allows for proper height of the trimmers with respect to the trellis and desired length of spurs or laterals. At the upper end of the vertical bar is mounted a stationary plate. Overlying the stationary plate is a swivel plate carrying a generally horizontal cutter element or trimmer. Supported on the stationary plate is a vertical cutter element or trimmer. The trimmers are in the nature of hedge trimming devices, and may be operated electrically, mechanically, hydraulically, or pneumatically. Since the horizontal trimmer, which is mounted on the swivel plate, is long enough so that it will encounter the trellis posts, it must be made capable of swinging in a horizontal plane rearwardly as the tractor advances. Sufficient rotational movement is designed into the swivel plate so that the trimmer conveniently passes by the post and then is brought back to its cutting position by spring action. In addition, the pruner includes a vine rod and a shield. The vine rod aids in guiding the vines to the trimmer blades, and in fact, forms an important element of this invention. The shield, placed generally below and forward of the cutter, also aids in guiding the vines, but also assists in the shedding of the clipping. Adjustment features are constructed into the pruner so that the angle settings of the blades, with respect to each other and with respect to the horizontal and vertical, can be easily and quickly made.

Accordingly, it is a feature of this invention to provide a mechanical pruning device which is simple in design, rugged in construction, and economical to manufacture.

Another feature of this invention is to provide a mechanical pruner device which practically eliminates the need for hand pruning.

Yet another feature of this invention is to provide a mechanical pruning device which can be operated off the power system of the tractor on which it is mounted.

Still another feature of this invention is to provide a mechanical grape pruner which could also be used to prune raspberry vines, rose bushes and vines, and other types of berry vines in addition to grape vineyards.

A further feature of this invention is to provide a mechanical pruning device which is so located on the tractor that control from the tractor operator's position by visual observation is easily obtained.

An even further feature of this invention is to provide a mechanical pruning device which will prune the spurs to the desired number of buds with great accuracy.

A still further feature of this invention is to provide a mechanical pruning device which is easily controlled from the tractor operator's seat and which allows the tractor operator to drive a straight path with the tractor without fear of harming the pruner attachments on trellis posts.

These and other advantages and features will become apparent in the details of construction and operation as more fully hereinafter described and claimed. Reference will be had to the accompanying drawings wherein like numerals refer to like parts throughout, and in which:

FIGURE 3 is an elevational view taken generally from the rear of the frame showing the movable horizontal and vertical bars, together with the cutting attachments;

FIGURE 4 is a front elevational view taken along the line 4—4 of FIGURE 3 and further illustrating the details of the cutting attachments; and FIGURE 5 is a view in perspective of the cutting portion of the pruner, and indicating in dash-dot lines the ability of the horizontal cutter to swing as it encounters obstacles such as trellis posts.

Figure 1:
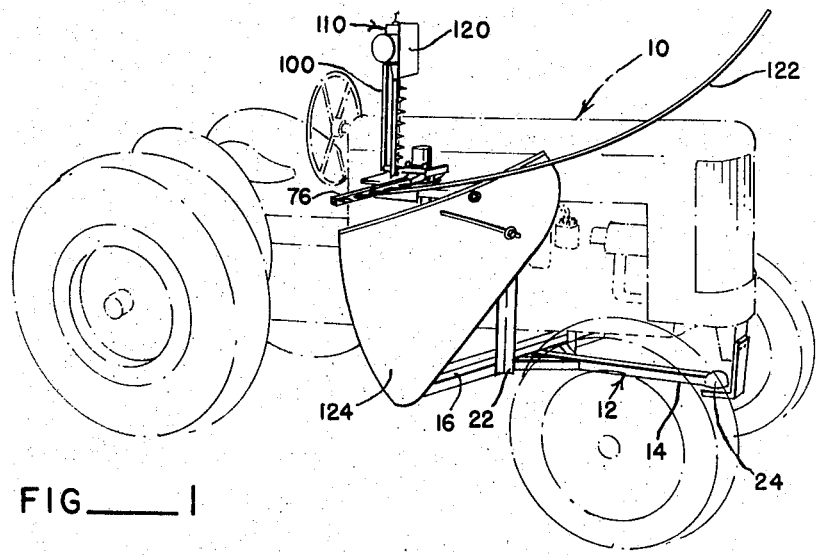
FIGURE 1 is a view in perspective showing a conventional utility tractor in phantom and a generally non-detailed depiction of the pruner frame and its various elements.

Referring now to the drawings, it will be seen that the tractor 10 has mounted thereon an under-slung three-point detachable frame structure, generally designated by the number 12. Frame 12 is essentially a T-shaped structure having longitudinal member 14 and hollow cross member or housing 16. Diagonal strengthening members 18 are provided to rigidize the frame structure. Housing 16 is provided with upstanding bracket members 20 to which the attachment angles 22 may be bolted. Note that the brackets 20 allow the angles 22 to be adjusted inwardly or outwardly, depending upon the type of utility tractor to which the frame is to be attached. The forward end of the longitudinal member 14 may have a conventional ball-and-socket type hitch or other form of conventional means for connecting the frame to the tractor. Appropriate means will be provided on the tractor to which the upper end of the attachment angles 22 may be secured as shown in FIGURE 3. Cross or transverse housing member 16 is in the form of a rectangular or square tube to slidably receive bar 26 therein. Housing 16 is open at both ends and on the pruner mounting end thereof; the bar 26 has a cylinder mounting bracket 28 rigidly secured thereto. A second bracket 30 is secured to the housing 16, and both brackets 28 and 30 preferably extend in a horizontal plane on the rear side of the frame. A cylinder 32 is pivotally connected to the housing bracket 30 and its piston rod 34 is pivotally received on the bracket 28. Thus, means are provided to move bar 26 so that it can be extended and retracted horizontally through a predetermined distance on the pruner side of the tractor.

Figure 2:
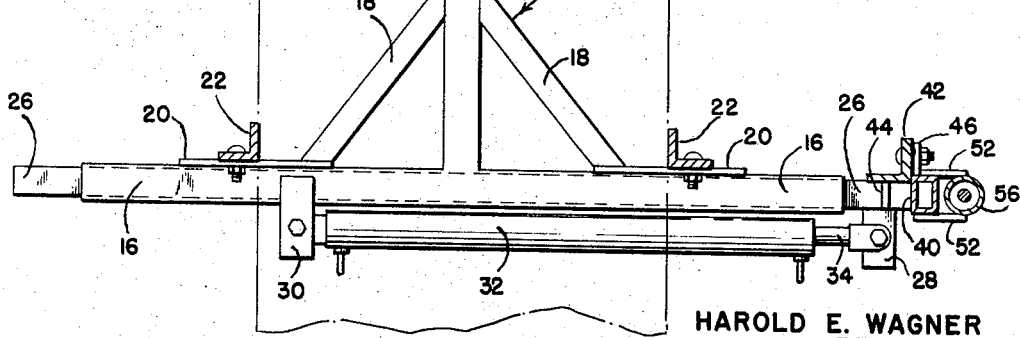
FIGURE 2 is a plan view of the under-slung, three-point supporting frame which is detachable from the tractor and which shows essentially the relationship of the frame to the tractor.

A vertical tubular housing 40 is upstandingly attached to the end of bar 26. Attachment of vertical tubular housing 40 is accomplished by virtue of a vertical angle support 42 secured to horizontal bar 26. Further strengthening of the connection between angle bracket 42, and bar 26 is accomplished with the triangular rigidizing piece 44 shown in FIGURES 2 and 3. Since it may be desirable to adjust the tubular housing 40 up or down, an adjustment bracket 46 is firmly secured, as for instance by welding, to the side of vertical housing 40. Angle bracket 42, of course, is provided with a series of holes ranging from top to bottom and thus, by aligning with a hole in angle bracket 42, the vertical tubular housing 40 may be detachably secured at the desired height. Vertical tubular housing 40 carries a vertical adjustment bar 50, slidably received therein. Brackets 52 are provided on the tubular housing 40 for receiving cylinder 56 while piston brackets 54 are secured to the vertical bar 50 for receiving piston 58.

The upper end of vertical bar 50 carries supporting structure which may be in the form of angle supports 60 and 62 as shown, or of some other design capable of accomplishing the necessary results. Secured to angle pieces 60 and 62, is a generally horizontally disposed stationary plate 64. Stationary plate 64 may take any desired shape so long as it provides for installation of other components of the pruning apparatus. A movable plate 66 overlies stationary plate 64 and is generally but not necessarily of the same shape as said stationary plate. The sides of the plates nearest the tractor are interconnected with a vertical pivot hinging mechanism 68, in this case simply shown as a nut and bolt assembly passed through aligned holes in the two plates. Said pivot permits the movable plate to swing over the stationary plate around said pivot point through an arc of at least 90°. Movable plate 66 has mounted thereon a cutting or trimmer device, the blade of which extends generally outwardly away from the side of the tractor in a generally horizontal plane. The horizontal cutter or trimmer generally designated by the number 70, is comprised of a motor portion 72, body 74 containing the drive components for the blades, and the blade or cutting element 76. Cutting element 76 is preferably a double blade affair with the cutting teeth of the element obviously facing in the direction of travel of the tractor. Element 76, on the average, will be about 16 to 30 inches in length, though this is by no means a required or necessarily even preferred dimension for such cutter. The horizontal trimmer 70 is held on the movable plate by a U-clamp 80 or other means of conventional construction. Trimmer 70 must be held rigidly on the plate so that any pressure brought to bear on the blade 76 will move the plate back, which has enough force to overcome spring bias. Trimmer 70 will be selected and located so that the cutting portion 76 thereof begins somewhere near the outer portion of the plates as best seen in FIGURES 3 and 5. Cutter element 76 may have further supporting structure in the form of bar brace 82 detachably secured to the outer end of the element 76 and detachably connected to plate 66. Thus, contacts by trimmer 70 with stationary objects will not bend or otherwise damage cutter element 76.

The movable feature of plate 66 is an important aspect of this apparatus because of the trellis posts. When the horizontal trimmer encounters post or other immovable objects, it is able to swing around pivot point 68 against pressure supplied as by spring 84 attached at one end to a permanent part of the structure and connected at its other end to some part of the movable structure. In this way, as soon as the horizontal cutter blade has cleared the obstacle, it will be pulled back into position.

The vertical cutter is positioned and supported generally in line with and at essentially right angles thereto in practically any desired manner. FIGURES 4 and 5 show that the vertical cutter should be aligned with the inner end of the horizontal cutter. It will also be appreciated with reference to FIGURES 4 and 5 that the particular supporting structure shown is merely illustrative and therefore non-limiting. In this particular instance, an upstanding supporting angle bracket 90 is secured to the permanent frame structure on the forward side of the frame pieces 60 and 62. Adjustable angle attachments 92 and 94 are secured to the upstanding supporting bracket 90. Note that the inner angular adjustment plate 92 attaches to said upstanding bracket 90 while the other section of the adjustment bracket 94 supports horizontal support bar 96. Support bar 96 will be provided with a series of holes to allow for desired positioning of the vertical cutter with respect to the inner end of the horizontal cutter. Connected to the outer end of the supporting bar 96 is a rearwardly generally horizontally extending connector rod 98. Note that rod 98 passes generally rearwardly over the body section 74 of the horizontal cutter from the front end to generally the rear side of the plate.

Attached to the rear end of rod 98 is a generally upstanding frame support member 100. The upper end of the upstanding frame member 100 has the co-acting angular adjustment brackets 102 and 104. A vertically disposed mounting plate 106 having attachment section 105 is secured to the angular adjustment bracket 104 while the upstanding frame member 100 is secured to its co-acting bracket 102. Mounting plate 106 has a U-clamp 108 for holding the vertical trimmer assembly generally designated by the number 110. Vertical trimmer 110 has motor 112, drive or body portion 114, and a cutting element 116. A shield 120 is attached on the forward side of the vertical trimmer assembly to protect the motor and drive parts. As can be seen from the drawings, vertical cutting blade 116 is generally aligned with the horizontal cutter near the inner end of the horizontal blade. It will be appreciated that the angular adjustment of brackets connected to the permanent supporting structure and consisting of elements 92 and 94, and in addition the angular adjustment brackets 102 and 104, permit the vertical cutter to be set at any desired position and angle with respect to the horizontal blade. Generally, however, the two trimmers form a generally L-shaped cutting assembly. While the vertical trimmer 110 is shown to be mounted on the outside of plate 106 it can easily be mounted on the rearside thereof.

In addition to the cutter assembly just described, two other important elements of the pruner apparatus are the curved vine bar 122 and the shield 124. Vine bar 122 is secured to the stationary plate 64 or other permanent non-moving parts. Note that vine bar 122 extends forwardly and upwardly, having as its main purpose to aid in guiding vines into the trimmers. Shield 124 likewise is connected to permanent structure, except that it too moves in and out and up and down in accordance with movements of the entire pruner mechanism. Vine bar 122 thus extends forwardly from a point beneath the vertical cutter. It is approximately six and one-half feet long. It is to be seen by reference to FIGURE 3, that vine bar 122 also may extend slightly inwardly towards the front end of the tractor. Exact positioning of the vine bar, however, will depend largely upon the condition of the trellis being pruned. Shield 124 is attached to stationary structure and its rear side edge extends downwardly near the rear of the pruner. From a line rearwardly of the entire cutting structure, it curves forwardly and inwardly toward the front end of the tractor. Shield 124, in addition to aiding and guiding the vines into the cutters, assists in the shedding of clippings by generally preventing the entanglement of vines and clippings from wrapping around various parts of the pruner apparatus.

Again, it should be emphasized that the specific frame and supporting features shown are merely illustrative and therefore nonlimiting. The importance of this invention is the combination of elements regardless of how they are designed, or upon what type of a vehicle they are mounted. And since others skilled in the art will readily devise alternatives at specific points, it is desired to embrace all structures falling within the scope of the claims.

What is claimed is:

1. A pruning apparatus, comprising: (a) a supporting frame adapted for attachment to a farm vehicle, including a generally horizontally, linearly movable member and a generally vertically, linearly movable member attached to said horizontally movable member; (b) a trimmer base structure mounted on said vertically, linearly movable member; (c) a generally horizontally disposed trimmer support pivotally connected to said trimmer base structure for movement in a generally horizontal plane; (d) a trimmer means detachably and securely mounted on said trimmer support for movement therewith; (e) a vine guide bar means mounted on and extending from said trimmer base structure forwardly of trimmer means and curving upwardly; (f) control means for moving said horizontally and vertically movable members of said supporting frame.

2. A pruning apparatus, comprising: (a) a supporting frame adapted for attachment to a farm vehicle, including a generally horizontally, linearly movable member and a generally vertically, linearly movable member attached to said horizontally movable member, said vertically movable member being located on one side of said vehicle; (b) a trimmer base structure mounted on said vertically, linearly movable member; (c) a generally horizontally disposed trimmer support pivotally connected to said trimmer base structure for movement in a generally horizontal plane in a direction opposite to that of the travel of said vehicle; (d) a trimmer means detachably and securely mounted on said trimmer support for movement therewith, said trimmer means and trimmer support being resiliently biased to a normal position extending outwardly from said vehicle; (e) a vine guide bar means mounted on and extending from said trimmer base structure generally forwardly and curving upwardly in the direction of travel of said vehicle; (f) control means for moving said horizontally and vertically movable members of said supporting frame.

3. A pruning apparatus, comprising: (a) a supporting frame adapted for attachment to a farm vehicle, including a generally horizontally movable member and a generally vertically movable member attached to said horizontally movable member; (b) a base structure mounted at the upper end of said vertically movable member; (c) a generally horizontally disposed first trimmer support pivotally connected to said base structure for movement in a generally horizontal plane; (d) a first trimmer means detachably and securely mounted on said first trimmer support for movement therewith and extending generally outwardly from said vehicle; (e) a vine guide bar means mounted on and extending from said base structure generally forwardly of and curving upwardly in the direction of travel of said vehicle; (f) an angularly adjustable, generally vertically disposed second trimmer support mounted on said base structure and having a second trimmer securely and detachably mounted thereon in a generally vertical position above the inner end of said first trimmer; and (g) control means for moving said horizontally and vertically movable members of said supporting frame.

4. A pruning apparatus, comprising: (a) a supporting frame adapted for attachment to a farm vehicle, including a generally horizontally movable member and a generally vertically movable member attached to said horizontally movable member; (b) a base structure mounted at the upper end of said vertically movable member; (c) a generally horizontally disposed trimmer support pivotally connected to said trimmer base structure for movement in a generally horizontal plane; (d) a generally horizontal trimmer means detachably and securely mounted on said trimmer support for movement therewith; (e) a vine guide bar means mounted on and extending from said base structure forwardly of trimmer means and curving upwardly; (f) control means for moving said horizontally and vertically movable members of said supporting frame; (g) a generally vertically disposed, adjustable vertical trimmer support mounted on said base structure and located over the inner end of said horizontal trimmer; and (h) a vertical trimmer means securely and detachably mounted on said vertical trimmer support.

References Cited
UNITED STATES PATENTS

| | | | |
|---|---|---|---|
| 355,396 | 1/1887 | Hileman | 56—236 |
| 1,281,111 | 10/1918 | Wilbur | 56—316 |
| 2,555,541 | 6/1951 | Hilblom | 56—25 X |
| 2,588,002 | 3/1952 | Holmes | 56—25 |
| 3,110,146 | 11/1963 | Latshaw | 56—25 |

ABRAHAM G. STONE, *Primary Examiner.*

RUSSELL R. KINSEY, ANTONIO F. GUIDA, *Examiners.*

M. C. PAYDEN, *Assistant Examiner.*